Figure 1:
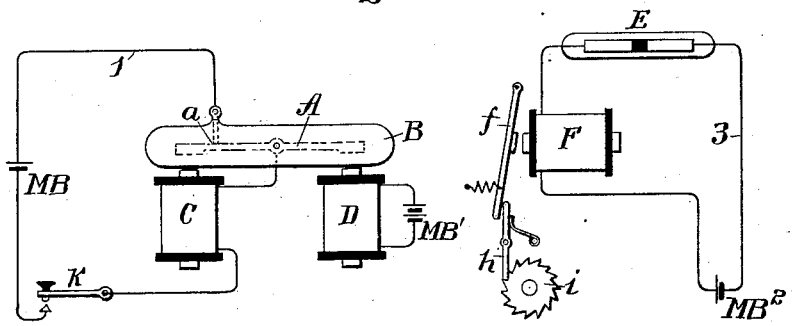

No. 723,176. PATENTED MAR. 17, 1903.
D. McF. MOORE.
APPARATUS FOR ELECTRIC CONTROL OF DEVICES AT A DISTANCE.
APPLICATION FILED DEC. 16, 1898
NO MODEL.

Witnesses:
Otto Greenberg
Ethel L. Lanker.

Inventor
Daniel McFarlan Moore
By
H. C. Townsend
Attorney

UNITED STATES PATENT OFFICE.

DANIEL McFARLAN MOORE, OF NEWARK, NEW JERSEY, ASSIGNOR TO THE MOORE ELECTRICAL COMPANY, OF NEW YORK, N. Y., A CORPORATION OF NEW YORK.

APPARATUS FOR ELECTRIC CONTROL OF DEVICES AT A DISTANCE.

SPECIFICATION forming part of Letters Patent No. 723,176, dated March 17, 1903.

Application filed December 16, 1898. Serial No. 699,423. (No model.)

*To all whom it may concern:*

Be it known that I, DANIEL McFARLAN MOORE, a citizen of the United States, and a resident of Newark, in the county of Essex and State of New Jersey, have invented certain new and useful Improvements in Apparatus for Electric Control of Devices at a Distance, of which the following is a specification.

My invention relates to those systems or apparatus in which electric control or operation of devices at a distance is effected without wires or conductors by "Hertzian" waves or oscillations generated under control at one point and propagated through space, reaching to another point, where they act upon a suitable coherer or receiver adapted to govern the condition of an electric circuit. When used for purposes of telegraphy, such a system is preferably termed a "Hertzian-wave" or "wireless" telegraph.

My invention or discovery relates more particularly to the manner of generating the waves or oscillations used in such a system of control or operation, the object being to improve the system by producing waves or oscillations of greater penetration or carrying power, thus enabling the control to be effected over longer distances than is possible with the apparatus and methods heretofore employed.

In previous apparatus the source of the waves has been a pair of metallic terminals or electrodes, across which a disruptive spark is maintained by electricity obtained from any suitable source—as, for instance, the secondary of an induction-coil. I have discovered that superior results may be obtained by using as the emitter or producer of the oscillations the electrodes or terminals of a circuit-interrupter operating in a vacuum to produce interruptions of a circuit of induction. For the best results the vacuum should be very high, so as to produce very abrupt changes of resistance in the circuit. A vacuum which is as nearly as may be an absolute vacuum is best suited to the practice of my invention. By "circuit of induction" I mean any circuit through which electric current flows from any suitable source of continuous, intermittent, pulsating, or alternating currents and which is adapted by its self-induction or by its induction upon a parallel circuit to generate electromotive forces at the point of separation.

By employing circuit-interrupters of the character hereinafter described, whereby an exceedingly high speed or rate of circuit interruption is obtained, I am enabled to secure very greatly improved results with electromotive forces or potentials of comparatively small amount, whereas heretofore in the art where a mechanical interrupter is employed the aim has been to secure a comparatively high potential by slowing down or retarding the rate of interruption of the circuit-interrupter in the primary of the induction-coil.

In my invention induction waves or oscillations are produced at the electrodes of a circuit-interrupter, and in this respect my invention differs materially from devices heretofore employed for the purpose, which involves the use of ball electrodes or surfaces or "capacity areas;" nor do I employ induction-coils and interrupters operating in the primary circuit while the secondary is connected to the electrodes of the emitter to maintain a spark.

At the receiving-point any proper or usual means for rendering the oscillations or waves sensible and for utilizing them to control an electric circuit may be employed. I may use the Branly coherer or any modification thereof or the form of instrument employed by Hertz for rendering such oscillations sensible and properly included in the electric circuit whose varying electric condition produces the desired operation directly or indirectly upon any translating device or device whose action is to be controlled.

Any circuit-interrupter of the character described in my Patent No. 548,127, dated October 15, 1895, may be used for the purposes of my invention, it being understood that in every case the interrupter-contacts are in a high vacuum and will operate to make and break a circuit of induction.

In the accompanying drawings I illustrate diagrammatically various forms of apparatus by which my invention may be practiced.

Figure 2:
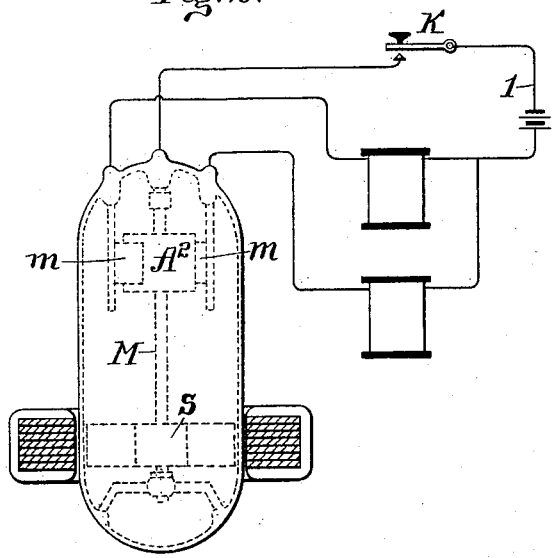

Figure 1 shows a form in which a vibrating interrupter is employed and in which the receiving apparatus comprises means for releasing a wheel instead of the usual telegraph-receiver which would be employed for wireless telegraphy. Fig. 2 shows a type of interrupter known as the "rotary" type.

In the accompanying drawings I have omitted to show the use of reflectors, which are sometimes employed for directing the oscillations toward the receiving-point, as also the means sometimes employed for adjusting the frequency of the oscillations or waves and the capacity areas which have been employed in some forms of wireless telegraphy, as these are all well known in the art. I would state, however, that it is desirable to arrange the electrodes of the emitter so that the radiations thereof will be best directed toward the receiving-point—that is to say, to arrange them with a view to the taking advantage of the fact that the radiations from an oscillator consisting of a pair of separated electrodes is greater in an equatorial than in the axial direction.

Referring now to the drawings, I show in Fig. 1 a circuit-interrupter capable of producing a very high rate of interruption—even as high as one hundred thousand times per minute. The interrupter is of the vibratory type, consisting of a circuit-closing lever A, mounted to work in a highly-exhausted receiver or inclosure B, preferably of glass and kept in vibration by an electromagnet C, whose pole is in close proximity to the armature of the lever A, but is preferably located outside the inclosure. The action of the electromagnet is to withdraw the armature or contact-lever A from connection with contact-point $a$, also within the inclosure, said lever and contact $a$ forming the electrodes or terminals of a circuit of induction 1, charged from any suitable source of energy M B and preferably including the coil C, whose self-inductive effects may be added to those which naturally belong to the circuit. The retractor for the armature-lever, which constantly tends to keep the circuit of induction closed, consists of an electromagnet D, exerting a constant influence upon an armature attached to the lever A, as shown. For this purpose the electromagnet D may be charged from any suitable source of electric energy M B'. In the circuit 1 is any key or circuit controller K, by which the operation of the apparatus may be controlled to vary or interrupt the production of the Hertzian waves or oscillations, though other means may obviously be employed for this purpose. At every interruption of circuit produced by the electromagnet C said magnet by that interruption loses its own power and electromagnet D immediately acts to restore the circuit, the operation being repeated at a very high rate. The degree of exhaustion in the receptacle B, as before stated, should be very high. Discharges of the circuit of induction across the interval between the contacts of the interrupter within the vacuum set up the waves or oscillations which operate the receiver. Said contacts become in substance the terminals of an emitter, although it is to be understood that in the normal operation of the device there is nothing in the nature of a disruptive spark across said terminals such as has been heretofore employed in the art where there is a breaking through of an air-gap. At the receiving-point, E typifies a coherer or device included in the circuit 3 and operating, as well understood in the art, to vary the resistance thereof. The circuit 3 may include any local source of energy M $B^2$, the flow of energy from which is varied by the said coherer, the usual effect being, as well understood, that when the transmitted oscillations impinge upon the coherer the resistance is lowered, to be restored by the rearrangement of the particles in said coherer by mechanical means or otherwise.

In the application of my invention herein shown the circuit 3 includes an electromagnet F, whose power increases under the effect of the oscillations or waves upon the coherer, and which may thereby be made to act more strongly upon an armature-lever $f$, and thereby disengage the pawl or detent $h$, which normally detains a wheel $i$. These parts are to be taken as merely typical of any mechanism for controlling mechanical or other power, and, as will be well understood, there may be substituted for them any other device whose action is to be controlled—as, for instance, a telegraph apparatus.

In the modification of my invention illustrated in Fig. 2 I show as a circuit-interrupter for generating the oscillations a rotary form of interrupter, the parts being inclosed in a sealed receiver and consisting of the shaft M, carrying circuit-breaking wheel $A^2$, which forms one terminal of the circuit of induction, while the brushes $m\, m$, bearing thereon, form opposite terminals of branches of said circuit of induction and interrupt the same in alternation. Rotation of the shaft M is produced by rotation of the magnetic field set up around the receptacle in the plane of a suitable armature S, secured to the shaft M, the organization being practically one which is described in my prior patent, No. 604,685, dated May 24, 1898. In this case, as before, the contacts of the interrupter operate as electrodes of an emitter whence the Hertzian waves or oscillations originate.

What I claim as my invention is—

1. In a Hertzian-wave or wireless-telegraph apparatus, an emitter or radiator consisting of electrodes or terminals of a circuit-interrupter operating in a high vacuum to interrupt a circuit of induction, combined with means such as a key or circuit for controlling a propagation of the waves or oscillations as and for the purpose described.

2. In a wireless apparatus for electric control or operation of devices at a distance by Hertzian waves or oscillations, an emitter or radiator consisting of electrodes or terminals of a circuit-interrupter operating in a high vacuum to interrupt a circuit having self-induction, and means for controlling the operation of said emitter, as and for the purpose described.

3. In an apparatus for electric control or operation of devices at a distance by the wireless system, an emitter or radiator consisting of contacts or electrodes of a circuit-interrupter operating in a high vacuum to interrupt a charged electric circuit, combined with means for controlling the operation of said emitter or radiator, as and for the purpose described.

4. In a Hertzian-wave wireless-telegraph apparatus, electrodes or terminals of a circuit-interrupter operating in a high vacuum to interrupt a circuit of self-induction, combined with means for controlling the propagation of the Hertzian waves or oscillations produced by the said interrupter as and for the purpose described.

5. In a system of wireless electric control or operation by Hertzian waves or oscillations, a source of radiation consisting essentially of electric contacts included within a vacuum and forming the poles of a charged electric circuit, combined with means for separating said contacts to propagate waves or oscillations suitable for operating on the distant apparatus, as and for the purpose described.

Signed at New York, in the county of New York and State of New York, this 10th day of December, A. D. 1898.

DANIEL McFARLAN MOORE.

Witnesses:
WM. H. CAPEL,
CLARENCE B. SHULTZ.